United States Patent [19]
Takeuchi et al.

[11] Patent Number: 5,448,473
[45] Date of Patent: Sep. 5, 1995

[54] METHOD OF AND SYSTEM FOR RECORDING AND RESEARCHING DOCUMENTS

[75] Inventors: Yoshikazu Takeuchi; Shinichi Shidara; Yutaka Takahashi, all of Tokyo, Japan

[73] Assignee: Fuji Photo Film Co., Ltd., Kanagawa, Japan

[21] Appl. No.: 933,213

[22] Filed: Aug. 21, 1992

[30] Foreign Application Priority Data

Aug. 23, 1991 [JP] Japan .................................. 3-235709

[51] Int. Cl.⁶ ............................................. G06F 17/30
[52] U.S. Cl. ................................. 364/419.19; 235/375
[58] Field of Search ..................... 364/419.19; 382/7; 395/600; 235/375

[56] References Cited

U.S. PATENT DOCUMENTS

| | | | |
|---|---|---|---|
| 4,264,808 | 4/1981 | Owens et al. | 235/379 |
| 4,571,699 | 2/1986 | Herzog et al. | 364/DIG. 2 |
| 4,601,003 | 7/1986 | Yoneyama et al. | 364/DIG. 2 |
| 4,760,606 | 7/1988 | Lesnick et al. | 382/48 |
| 4,797,946 | 1/1989 | Katsuta et al. | 382/6 |
| 4,907,283 | 3/1990 | Tanaka et al. | 382/40 |
| 4,996,664 | 2/1991 | Fujiwara et al. | 364/DIG. 2 |
| 5,065,347 | 11/1991 | Pajak et al. | 395/159 |
| 5,081,688 | 1/1992 | Sakuragi | 382/11 |
| 5,084,769 | 1/1992 | Miura | 358/403 |
| 5,124,748 | 1/1992 | Tanabe et al. | 355/200 |

Primary Examiner—David M. Huntley
Attorney, Agent, or Firm—Sughrue, Mion, Zinn, Macpeak & Seas

[57] ABSTRACT

A method of recording multiple kinds of documents successively while sorting them into plural document groups and then searching target document groups from the thus recorded document groups. Also provided is a system used for the realization of the aforementioned method. An illustrated title for identifying each document group and for discriminating the first document of each document group is recorded in an illustrated title recording medium which is separated from the document recording medium, and the correspondence between each illustrated title and the address of document groups identified by each illustrated title is recorded in an address recording medium so that access to target document groups, at the searching step, may be made by displaying all of the recorded illustrated titles and then designating one or more of illustrated titles selectively. The illustrated title is present on a partition plate interposed between respective document groups, or a reduced image or a portion of any one of the documents is defined to be used as the illustrated title by the partition plate or a discrimination mark attached on the first document of each document group.

20 Claims, 15 Drawing Sheets

METHOD OF AND SYSTEM FOR RECORDING AND RESEARCHING DOCUMENTS

BACKGROUND OF THE INVENTION

1. Field of the Invention

The present invention relates to a method of recording multiple documents successively while sorting them into plural document groups and then searching target document groups from the thus recorded document groups. The present invention also relates to a system used for the realization of the aforementioned method.

2. Prior Art

It has been proposed to store addresses of document groups, for example, by a computer, the addresses of target document groups being searched and then designated by the computer to accomplish rapid searching operation.

In the conventional system, the input data for searching addresses of respective document groups are letters indicating, for example, the titles, contents, names of operators or date of inputting such data. Consequently, it is required to read the identification letters for searching target document groups. This leads to the result that such a searching operation costs a long time and is not efficient.

In addition, the letters for discriminatively identifying particular document groups or the codes for searching particular document groups must be manually inputted through a keyboard to reduce the speed at the step of recording documents.

OBJECTS AND SUMMARY OF THE INVENTION

The first object of this invention is to provide a method of recording documents which are sorted into plural document groups rapidly within a short time without the need of manual typing operation, the target document groups being identified rapidly by designating the corresponding illustrated titles for the document searching purpose. Since the illustrated titles are simple symbol marks or other type titles which can be easily discriminated by eyes, designation of particular illustrated title can be made quickly by the operator.

The second object of this invention is to provide a system for the realization of the aforementioned method.

The first object of this invention is attained by the provision of a method of recording and searching documents sorted into plural document groups, wherein the top document of each document group is discriminated and an illustrated title corresponding to each document group is recorded on an illustrated title recording medium which is different from the recording medium on which documents are recorded, the addresses of document groups corresponding to respective illustrated titles being recorded so that access to target document groups, at the searching step, may be made by displaying all of these illustrated titles and then designating one or more of illustrated titles selectively.

The second object of this invention is attained by the provision of a system for recording and searching documents sorted into plural document groups, comprising a document group discriminator for discriminating the first document of each document group, an illustrated title recording medium for recording illustrated titles corresponding to respective document groups, display means for displaying said illustrated titles, designating means for designating any one or more of the thus displayed illustrated titles, a document recording medium for recording said documents, an address recording medium for recording addresses of document groups in said document recording medium, the addresses being recorded correspondingly for individual illustrated titles, and searching means for searching to access target document groups designated by said designating means.

The document groups may be discriminated by sensing partition plates interposed between respective document groups. However, in lieu of the provision of such partition plates, discrimination marks (optical, magnetic, etc.) may be attached to, for example, the first document of each document group.

The term "illustrated title" as used herein throughout the specification and claims stands for an image identifying the characteristic feature or content of each document group and involving an illustration and letters which can be easily distinguishable by eyes. Such an illustrated title may be attached to the partition plate. In a modified embodiment, each of the illustrated titles may be a reduced scale image or a portion of any one of the documents contained in individual document groups, the reduced scale image or portion of individual document groups being defined by a partition plate or discrimination mark provided before each document group for discriminating the first document of each document group.

In the system of this invention, the illustrated titles and the documents may be recorded on a single common digital recording medium, such as an optical disk or a magneto-optical disk (rewritable optical disk). Alternatively, documents may be duplicatively recorded on a digital recording medium and also on a microfilm, and either one or both of the outputs from the digital recording medium and microfilm may be used for the searching operation in which target document groups are designated by the illustrated titles. In a further modified embodiment, documents are recorded only on a microfilm and the illustrated titles and addresses are recorded on a digital recording medium, such as a floppy disk. In a still further embodiment, only a microfilm is used as a sole recording medium.

DESCRIPTION OF APPENDED DRAWINGS

DESCRIPTION OF PREFERRED EMBODIMENTS

Method of the Invention

Figure 1:
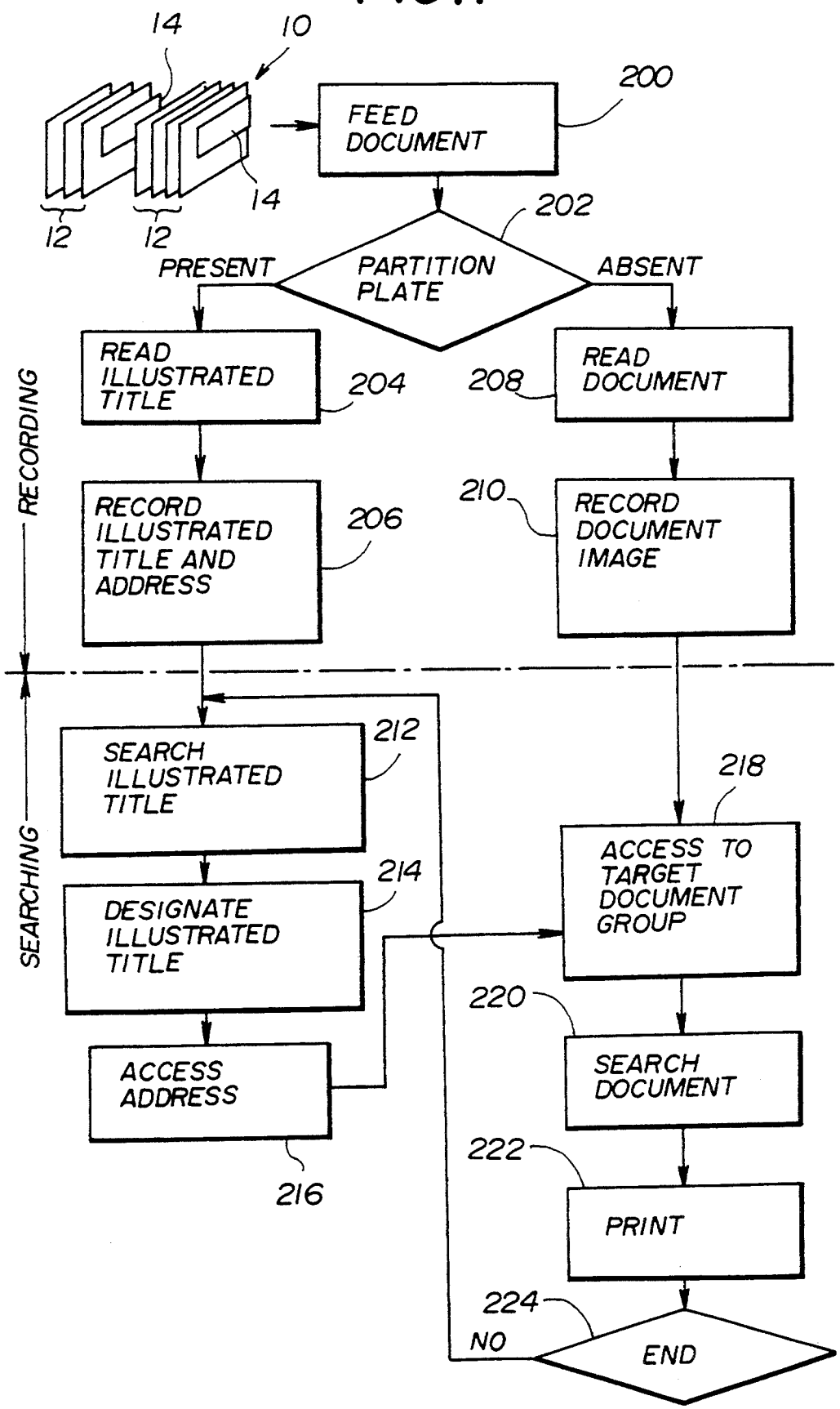
FIG. 1 is a block diagram showing the principle of the present invention.

The method of the invention will be initially described with reference to FIG. 1. FIG. 1 is a block diagram showing the principle of the invention.

The present invention may be applied for the recording and searching of a number of commercial bills, checks or like which have individually predetermined shapes and dimensions. The documents 10 are sorted into groups 12 by referring to some standard for sorting, for example, sorted for every branch offices, for every date or for every kinds. A partition plate 14 is inserted at the top of each document group 12, and then the document groups 12 are fed into a document feeder (Step 200).

The documents 10 are fed automatically through a recorder where the partition plates 14 are sensed (Step 202). Upon sensing of respective partition plates 14, illustrated titles are read by an image reader or like means (Step 204). The illustrated title may be a letter or figure on each partition plate 14 or a portion of any one of the documents 10, for example the first document of each document group, designated by each partition plate 14.

The illustrated titles and corresponding addresses of document groups are recorded in an illustrated title recording means or medium and address recording means or medium, respectively (Step 206).

When documents 10 are fed, following the partition plate 14, images of these documents 10 are read, for example, by an image reader (Step 208) to be recorded in document recording means or medium (Step 210).

After the illustrated titles, addresses and documents have been recorded as aforementioned, searching may be made as follows. Initially, illustrated titles are accessed from the illustrated title recording medium and displayed on a display device, and target document groups 12 are searched by referring to the thus displayed illustrated titles. Since each illustrated title is made of a figure, title or keyword showing the character of each document group 12, the target document groups 12 can be intuitively searched by naked eyes (Step 212).

When the illustrated title identifying the target document groups 12 is designated by using proper designating means, such as a pointing device (for example, mouse, touch panel or light pen) or a keyboard (Step 214), the addresses of the target document groups in the document recording medium are known by referring to the address recording medium in response to the signal generated by the designating operation (Step 216). The document groups 12 stored at the thus known addresses in the document recording medium are accessed (Step 218) to accomplish searching (Step 220).

Searching may be effected by viewing the images of the documents displayed on a display device, such as CRT or a liquid crystal plate, when an optical disk is used as the document recording medium. Otherwise, when the documents are recorded or photographed on a microfilm, searching may be effected by viewing the images of the documents displayed on a screen of a microfilm reader. When a desired document has been found, the image thereof may be fed to a printer, transferred through a facsimile or fed to an external terminal device. The step 212 et seq are repeated until necessary searching is completed (Step 224).

As described above, illustrated titles are recorded collectively so that searching can be effected by viewing the illustrated titles, according to the invention.

First Embodiment

Referring to FIGS. 2 to 7, a first embodiment of the system of the invention will now be described. In this first embodiment, all data including the illustrated titles, document images and addresses are recorded in an optical disk device, and the document images are duplicatively recorded on a microfilm. This embodiment has an advantage that the operator can make use of the characteristic features of the two different recording media such that an image is taken from the microfilm when an output image of high quality is desired, whereas an image is taken from the optical disk to have the benifit of simple and rapid access when the quality of output image needs not so high.

Figure 2:
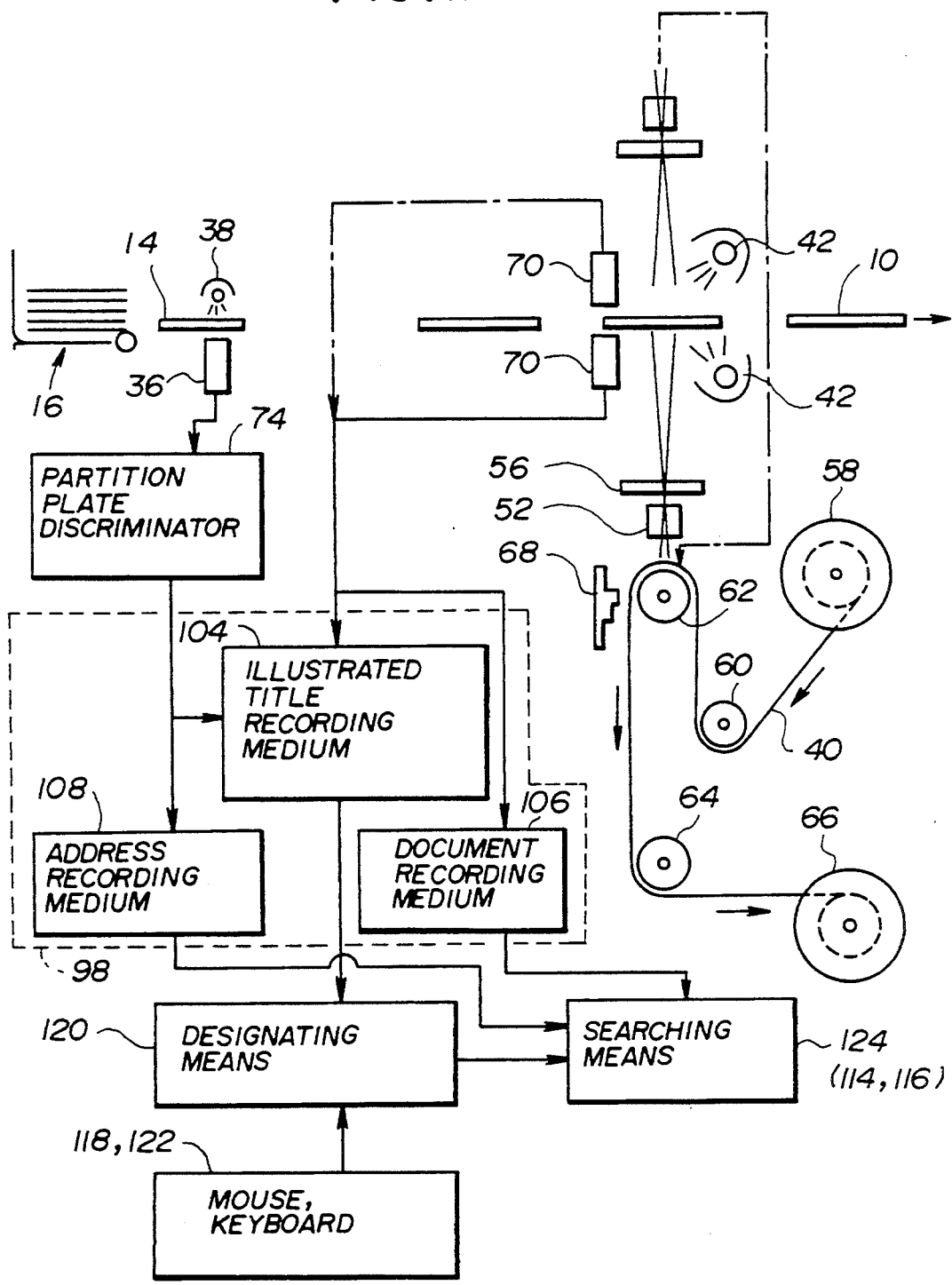
FIG. 2 is a schematic illustration showing the recording process of a first embodiment of the invention.
Figure 3:
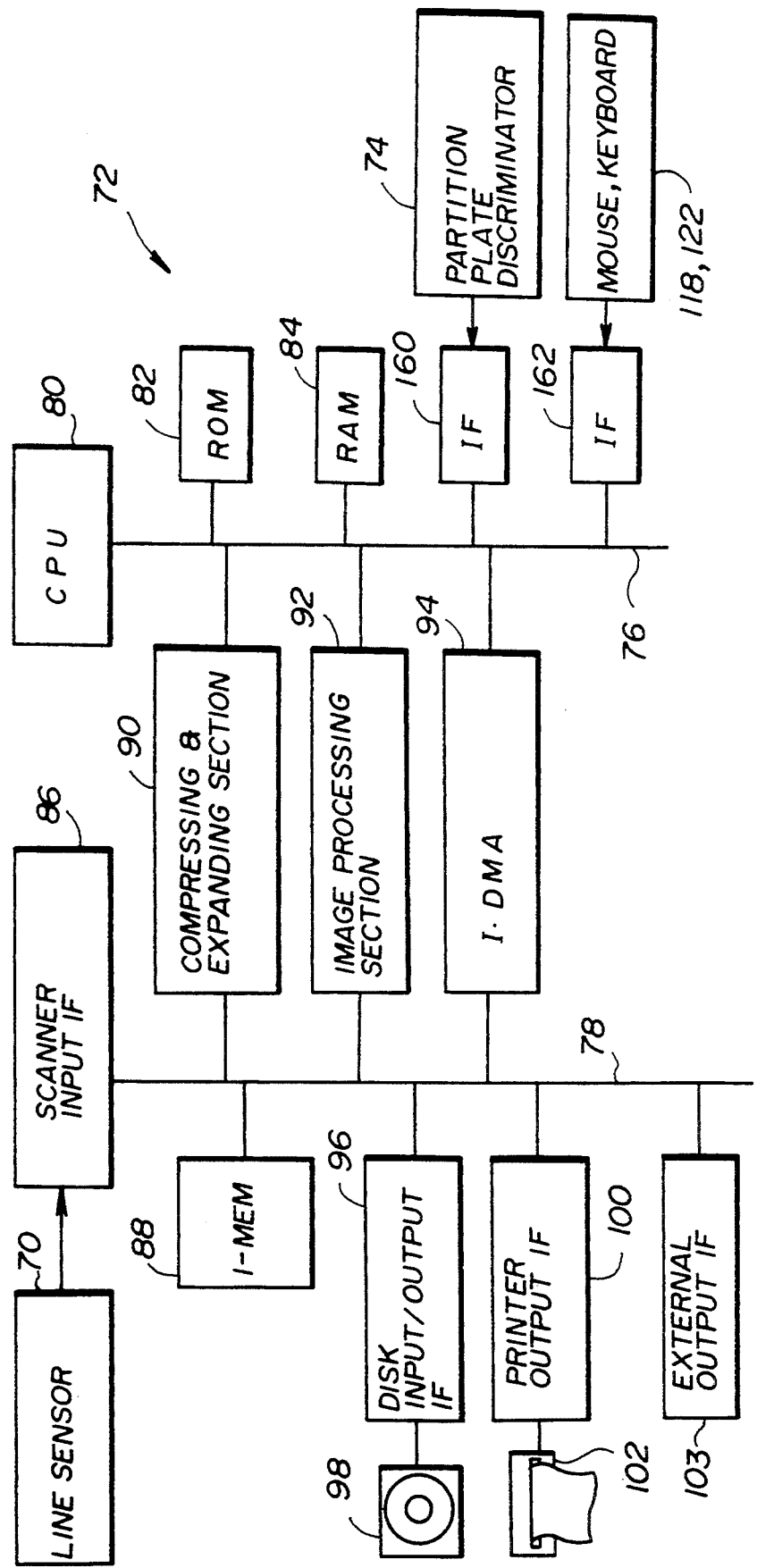
FIG. 3 is a block diagram showing the processing steps of the first embodiment by a searching computer.
Figure 4:
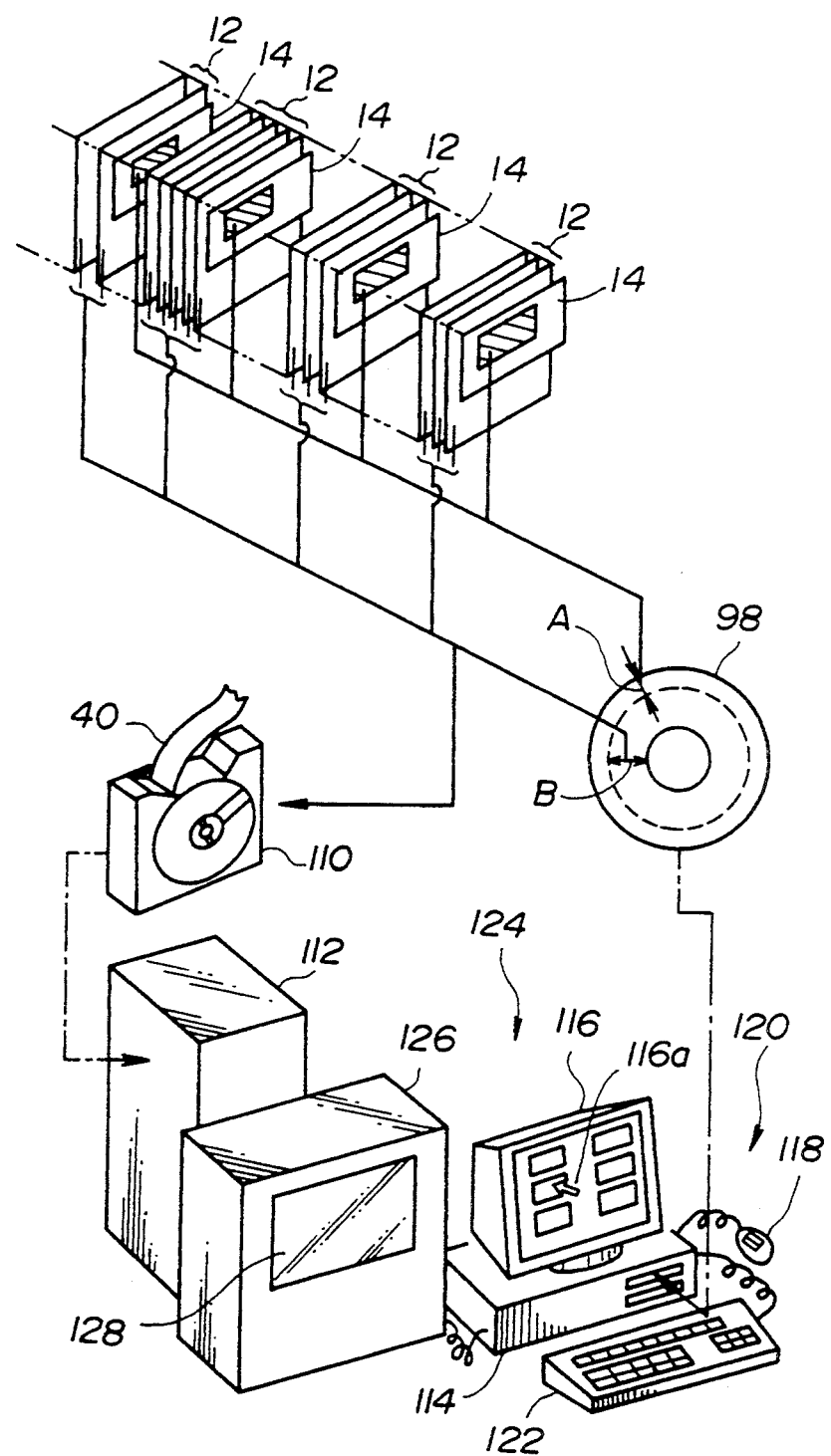
FIG. 4 is a schematic illustration showing the searching process of the first embodiment.
Figure 5:
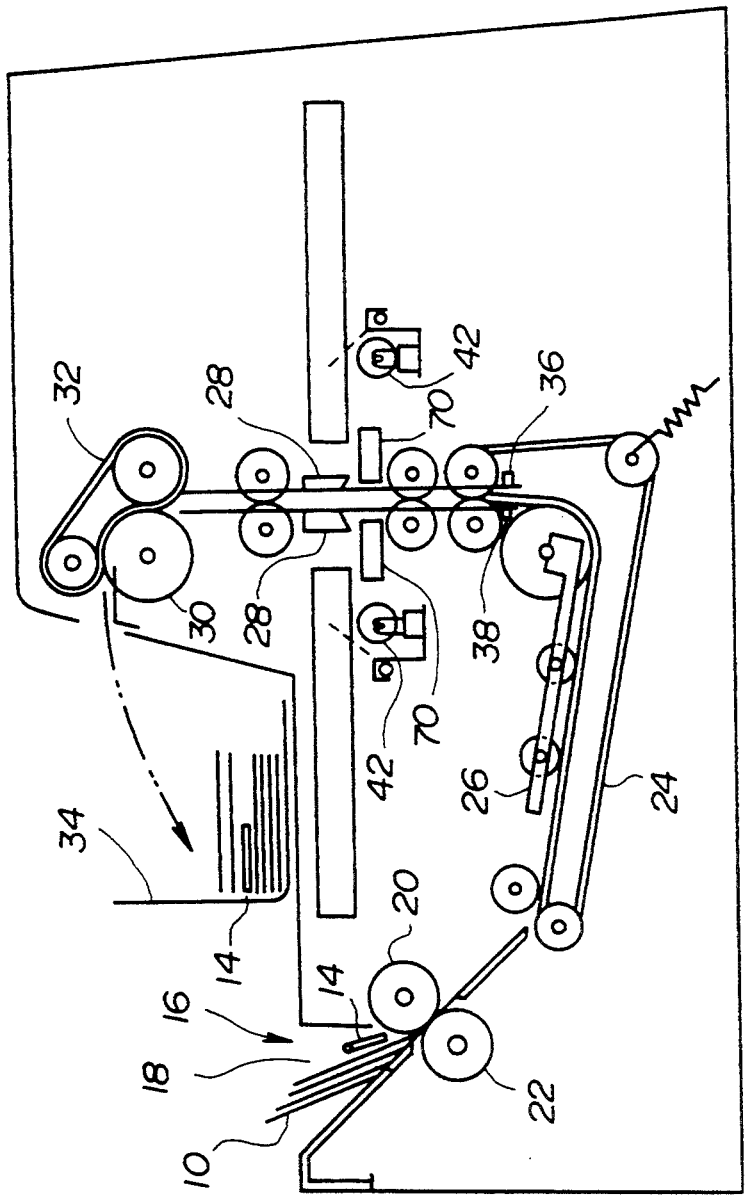
FIG. 5 is a schematic illustration showing the document feeder.
Figure 6:
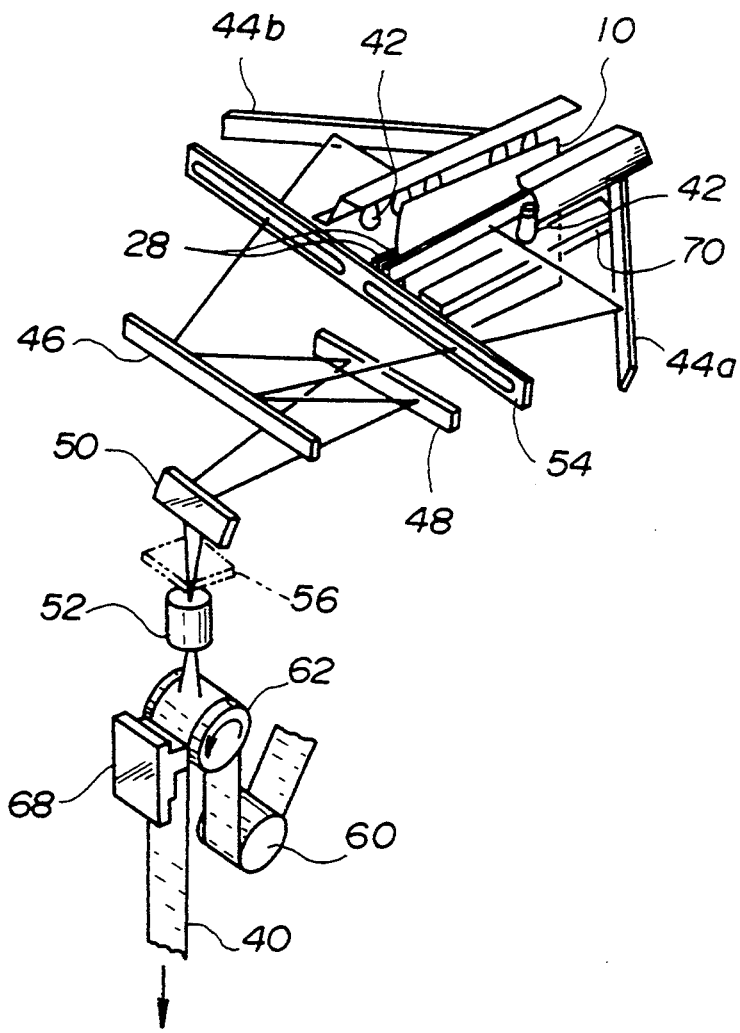
FIG. 6 is a schematic illustration showing the optical system for photographing documents on a microfilm.
Figure 7:
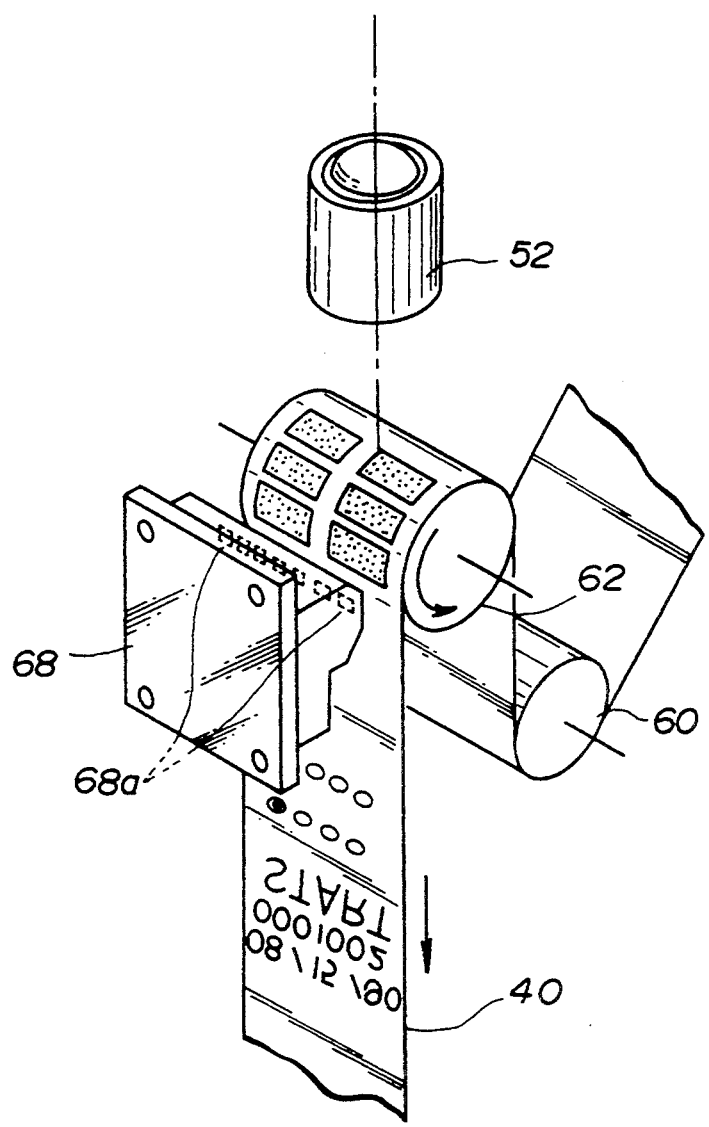
FIG. 7 is an enlarged view showing a portion of the optical system of FIG. 6.

FIG. 2 is a schematic illustration of the recording process of the first embodiment; FIG. 3 is block diagram showing the processing steps of the first embodiment by a computer; FIG. 4 is a schematic illustration showing the searching process of the first embodiment; FIG. 5 is a schematic illustration showing the document feeder; FIG. 6 is a schematic illustration showing the optical system for photographing documents on a microfilm; and FIG. 7 is an enlarged view showing a portion of the optical system of FIG. 6.

Documents 10 are fed one after another through a document feeder 16 shown in FIG. 5. The documents 10 are supplied in the overlapped condition into an inlet port 18, partition plates 14 each having a width different from the width of the documents 10 being interposed between respective document groups 12. A rotating roller 20 engages with the upper side of the uppermost document 10, while another roller 22 rotating in the direction reverse to the rotating direction of the roller 20 engages with the back side of the uppermost document 10. The overlapping documents 10 are thus fed to a photographing section one by one from the uppermost document. A conveyer belt 24 runs around a proper number of rollers, and a roller unit 26 engages, under pressure, with the conveyer belt 24 so that each document 10 is conveyed between the belt 24 and the roller unit 26. Each document is then conveyed through an upstanding path to pass through the slit between photographing glass plates 28, 28. Then, each document 10 is grasped by a discharge roller 30 and a belt 32 pressed on the discharged roller 30 to be discharged to a stacker 34.

Each document is photographed during it passes through the slit between the photographing glasses 28, 28 and the leading and trailing ends thereof are sensed by a document sensor 36. In detail, a light emitting element 38, such as LED, is arranged at one side of the path, through which each document 10 travels, and a sensor 36 is arranged opposite to the element 38. Each of the travelling documents 10 shields the light from the element 38, so that the passage of each document 10 is detected by the sensor 36.

Both sides of each document 10 are photographed concurrently when the document 10 passes through the slit between the photographing glass plates 28, 28, so that images of the obverse and reverse sides of each document sheet 10 are reproduced on a microfilm 40 to form two images placed in parallel relationship with each other (so-called duplex type system).

In detail, as shown in FIG. 6, the document 10 is illuminated by plural exposure lamps 42, 42 arranged outsides of the photographing glasses 28, 28, so that the images on the obverse and reverse sides of the document 10 are led, respectively, through mirrors 44a, 44b, and then through mirrors 46, 48 and 50 to a photographing lens 52 to be focused on a microfilm 40 below the lens 52. The images on the obverse and reverse sides of the document 10 are focused on the microfilm 40. Each of the images focused on the microfilm 40 is a slit-form image extending in the direction perpendicular to the travelling direction of the document 10, since the image-bearing lights pass through-the slits 54. A shutter 56 is disposed above the photographing lens 52 to allow intermittent passage of image-bearing light.

The feed passage of the microfilm 40 running at a constant rate below the lens 52 will now be described with reference to FIG. 2. In FIG. 2, reference numeral 58 designates a feed spool for feeding the microfilm roll 40, and the film 40 paid from the spool 58 is fed through a guide roller 60, an exposure roller 62 and another guide roller 64 to be taken up around a take-up spool 66. The exposure roller 62 is positioned at a location higher than the guide rollers 60, 64, and the microfilm 40 runs over the exposure roller 62 while firmly fitting over the upper half circumference of the roller 62. The photographing lens 52 is positioned above the exposure roller 62 and focuses contracted projected images on the film 40 running around the exposure roller 62. The guide roller 64 is rotated at a constant speed by a motor (not shown) to keep the film feeding rate at a constant rate.

Reference numeral 68 designates a line LED comprising plural small light emitting elements (light emitting diodes in this embodiment) 68a arranged along a linear line. This line LED 68 is disposed at one side of the exposure roller 62 to focus a linear .image along the widthwise direction of the film 40 within the range where the film 40 is firmly fitted around the exposure roller 62, namely within the range of the upper half circumference of the roller 62.

Respective LED 68a of the line LED 68 are selectively on or off in synchronism with the feed rate of the film 40 by not-shown controller, whereby predetermined data, for example, blip marks, discrimination marks for discriminating respective document groups or date of photographing, may be recorded.

As shown in FIGS. 2 and 5, CCD line sensors 70, 70 for reading each document 10 are disposed below the photographing glass plates 28.

Outputs from the document sensor 36 and the line sensors 70, 70 are fed to a control device 72, as shown in FIG. 3. The outputs from the sensor 36 are fed to partition plate discriminator 74 where the partition plates are discriminated by sensing the difference in width between the documents 10 and the partition plates 14, so that the top or first document of the feeded document group following the partition plate is discriminated. In other words, the partition plate discriminator 74 also serves as the document group discriminator in this embodiment.

As shown in FIG. 3, the control device 72 has two data transfer buses 76, 78, one bus 76 is for CPU and the other bus 78 is for image data. The bus 76 for CPU is connected to CPU (central processing unit) 80, ROM 82 and RAM 84. Image data read by the line sensor 70 are converted into digital signals which are passed through a scanner input interface (IF) 86 and an image data bus 78 to necessary units.

Reference numeral 88 designates an image data memory (hereinafter referred to as "I-MEM"), and composed of a semiconductor memory device capable of high-speed writing and reading. This I-MEM is connected to the bus 78.

Reference numeral 90 designates a compressing and expanding section, and connected to both buses 76, 78. The compressing and expanding section 90 compresses the read image data, for instance, prior to transfer the same to an external terminal unit, such as facsimile or display device; or expands to restore the data which have been transferred from an external terminal unit in the compressed state.

An image processing section 92 is connected to both buses 76, 78. This image processing section 92 effects various spatial filtering processings, such as edge emphasizing, thinning or dithering through a differentiation processing, based on the original read data.

Reference numeral 94 designates a control section for controlling data transfer (I-DMA, Image Direct Memory Access), and controls the transfer of data between various memories and various input or output interfaces (86, 96, 100, 103,160 and 162) or the direct transfer of data between a memory to another memory. In this embodiment, transfer of image data is effected through the DMA system where image data are transferred without passing through the CPU 80, and thus the CPU 80 needs not be operated to effect any processing until the completion of transfer after the required parameters including the memory address for initiating transfer and the time of transfer are set on the I-DMA control section 94.

Reference numeral 96 designates a disk input/output interface, and is interposed between the bus 78 and an external memory medium 98 such as an optical disk.

Reference numeral 100 designates a printer output interface, and is interposed between the bus 78 and a printer 102.

Reference numeral 103 designates an external output interface for feeding the output to an additional external terminal device.

Reference numeral 160 designates an input interface interposed between the bus 76 and the partition plate discriminator 74.

Reference numeral 162 designates an input interface interposed between the bus 76 and the mouse 118 or keyboard 122.

Referring back to FIG. 2, as the partition plate discriminator 74 discriminates a partition plate 14 upon receipt of the output from the sensor 36, the image on the partition plate 14 is read as the illustrated title by the line sensor 70 which serves as the illustrated title recording means so that the thus read illustrated title is recorded in the illustrated title recording medium 104. Then, the documents 10 of the document group 12 following the partition plate 14 is recorded in the document recording medium 106. The address of the document group 12 recorded in the document recording medium 106 is recorded in the address recording medium 108.

In the illustrated embodiment, these recording media 104,106 and 108 comprises a single common external memory device 98, for example, an optical disk (see FIGS. 3 and 4). The memory device 98 will be referred to as "optical disk" in the following description. The illustrated titles and addresses are recorded in the peripheral margin area A of the optical disk 98, whereas the images of the documents 10 are recorded in the internal area B. The illustrated titles may be recorded in the area B, and in such a case the addresses thereof are recorded in the area A.

On the other hand, the microfilm 40, on which images of the documents 10 are photographed, is contained in a cartridge 110 and stored in a rack 112 which allows automatic searching.

When searching is effected by using the optical disk 98, the optical disk 98 is charged in a computer 114 (see FIG. 4) containing therein the control device 72 shown in FIG. 3, and only the illustrated titles are displayed on the display tube of a CRT display device 116. The operator views multiple illustrated titles displayed on the tube, and then designates one or more target document groups 12. Designation operation may be effected by designating a desired illustrated title using a designating means 120 comprised, for example, of a mouse 118 and a cursor 116a on the display tube. A cursor key of a keyboard 122 may be used in place of the mouse 118, or the desired illustrated title may be designated through a touch panel.

When one of the illustrated titles is designated, the CPU 80 read addresses of the document groups 12 corresponding to the designated illustrated title from the area A of the optical disk 98, and then the images of the corresponding documents are accessed to be displayed on the display device 116. The operator feeds the images of the documents 10 one by one by manupilating the keyboard 122 to conduct the searching operation. In this embodiment, searching means 124 (FIGS. 2 and 4) is comprised of the computer 114 and the display device 116.

The document groups 12 corresponding to the designated illustrated title may be displayed on a microfilm reader 126 (see FIG. 4). In such a case, the cartridge 110 containing the microfilm 40 corresponding to the optical disk 98 is pulled out of the rack 112 and charged in the reader 126. The reader 126 displays the document groups 12 corresponding to the designated illustrated title on the screen 128. The images of the documents 10 may be fed by using the keyboard or the manipulator of the reader 126.

Second Embodiment

Figure 8:
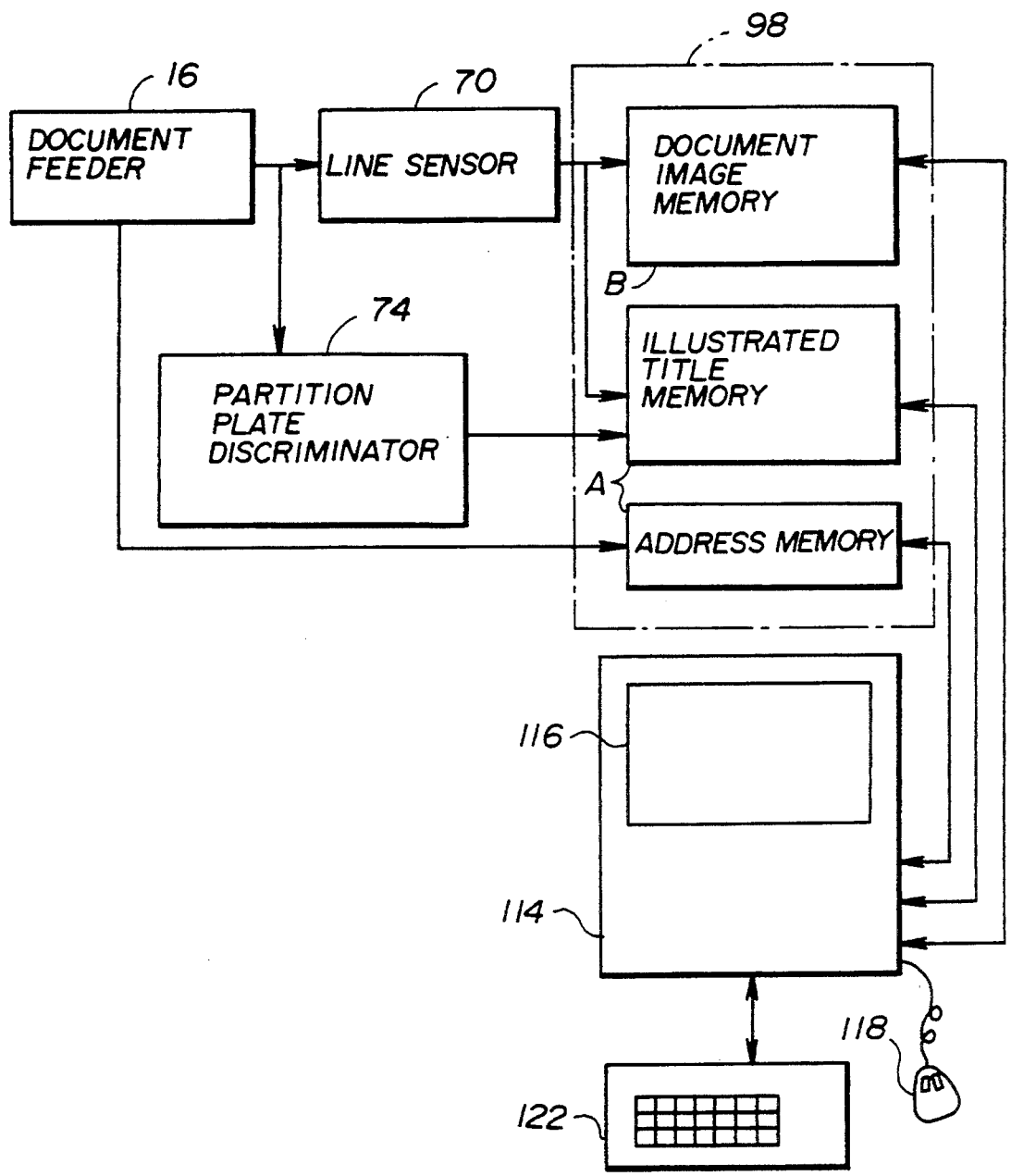
FIG. 8 is a block diagram showing a second embodiment.
Figure 9:
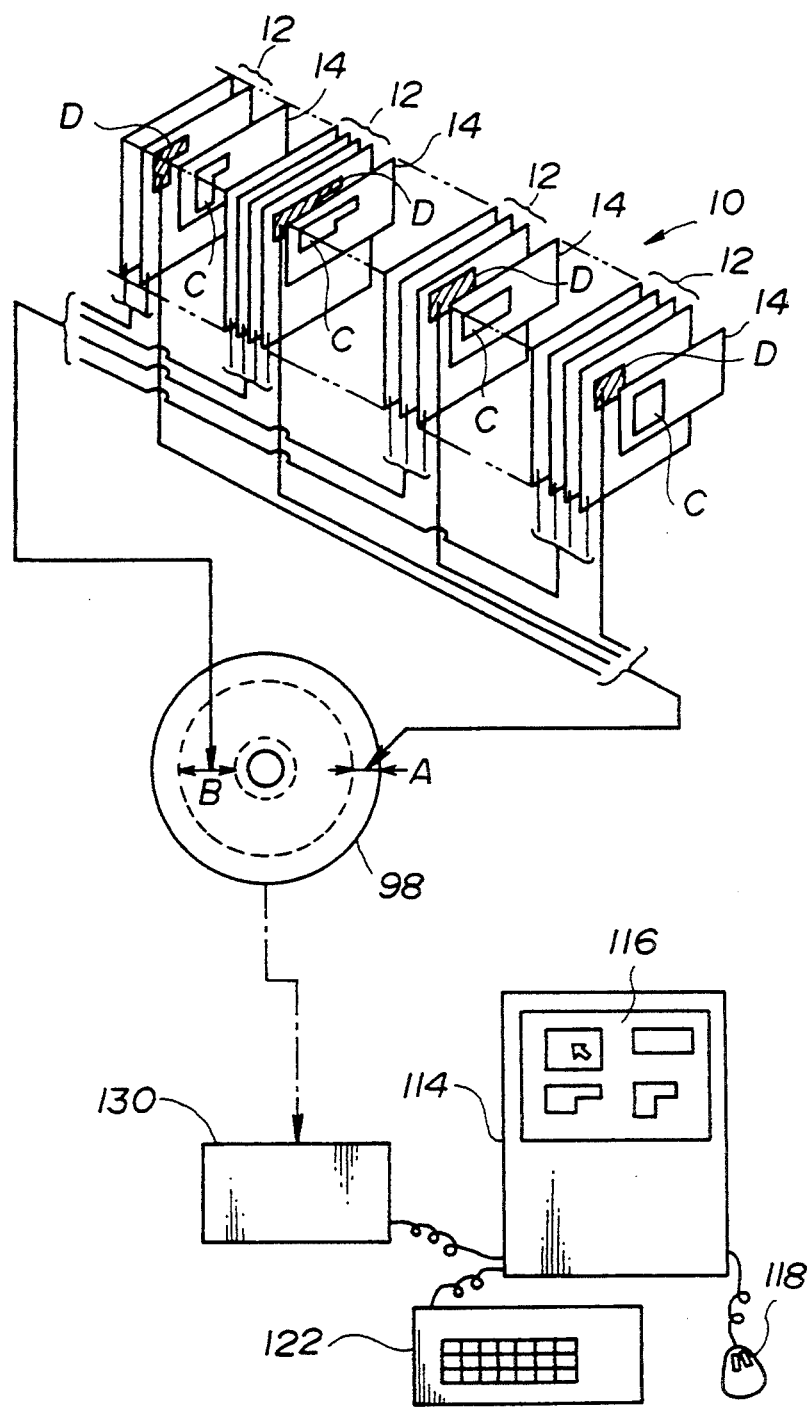
FIG. 9 is a schematic illustration showing the second embodiment.

FIG. 8 is a block diagram showing a second embodiment, and FIG. 9 is a schematic illustration showing the second embodiment. In this embodiment, recording on the microfilm 40 in the first embodiment is not effected, and only the optical disk 98 is used as the recording medium.

Partition plates 14 are discriminated from the documents 10 fed through the document feeder 16 by the partition plate discriminator 74, and illustrated titles are read by the line sensor 70 and recorded within the area A of the optical disk 98 which serves as an external memory means. The addresses of the document groups 12 recorded within the area B of the optical disk 98 are also recorded in the area A. Then, images of the documents 10 of the document groups 12 are recorded within the area B successively at the locations shown by respective addresses.

In searching, the optical disk 98 is charged in a disk driving device 130, the following operations being effected similar to the first embodiment while using the computer 114, the display device 116, the mouse 118 and the keyboard 122.

Meanwhile, in this embodiment, a portion D on the document 10 (the first document 10 of the document group 12) coextensive with a region C shown on the partition plate 14 is read as the illustrated title, as will be seen from FIG. 9. For example, by defining the region on which a title, name or figure on the first document 10 is present, the thus defined region or portion may be used as the illustrated title.

Third Embodiment

Figure 10:
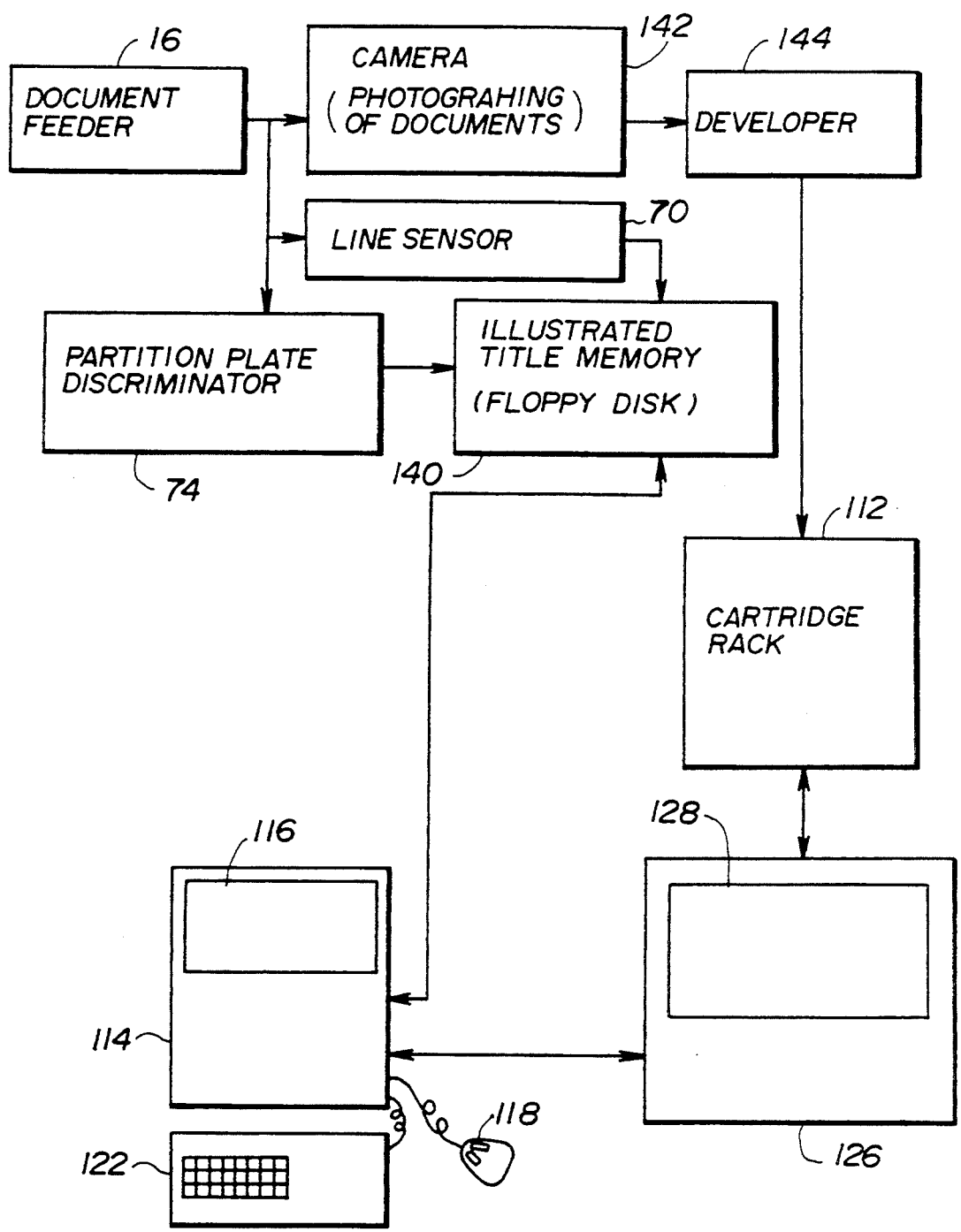
FIG. 10 is a block diagram showing a third embodiment.
Figure 11:
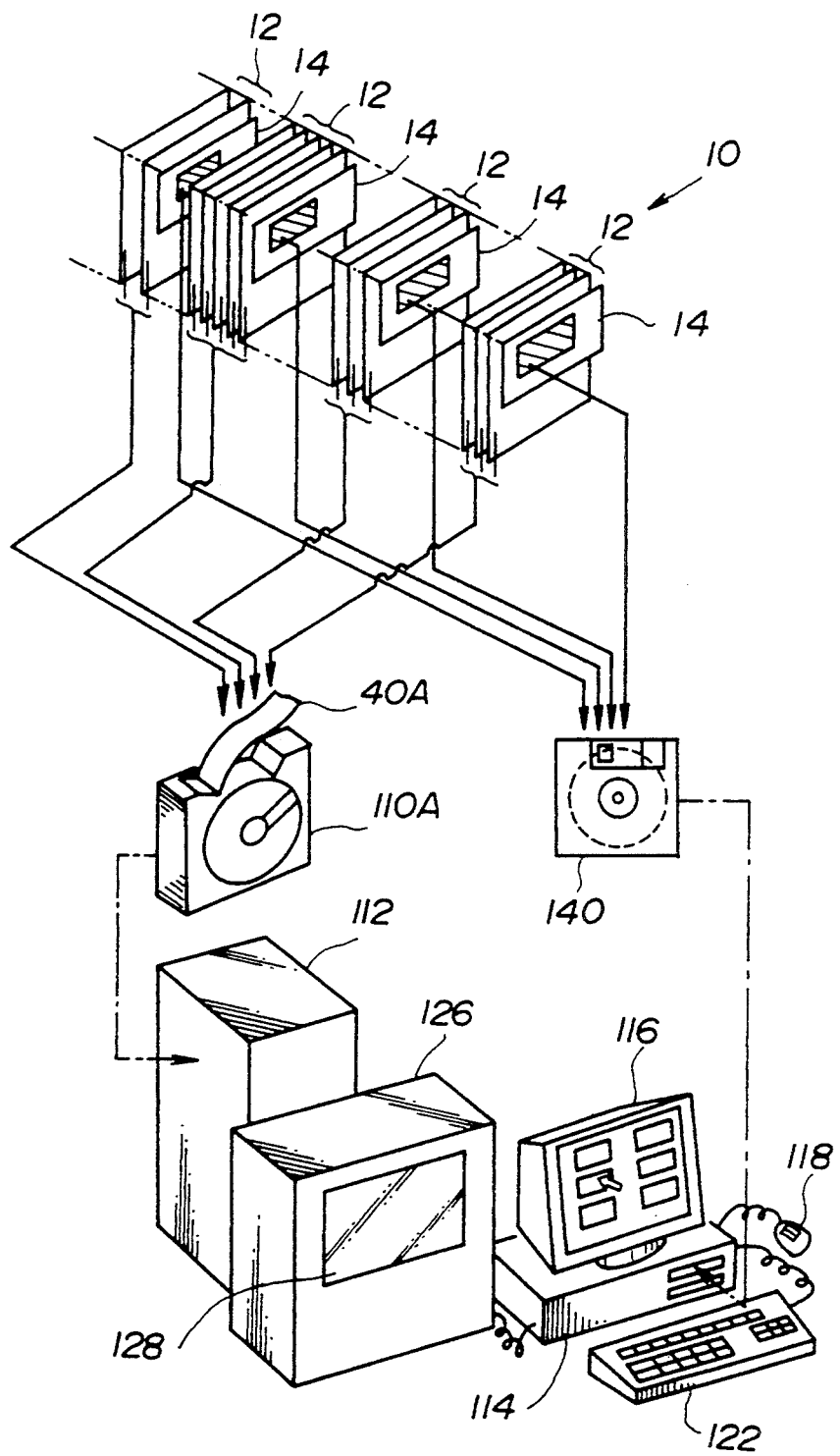
FIG. 11 is a schematic illustration showing the third embodiment.
Figure 12:
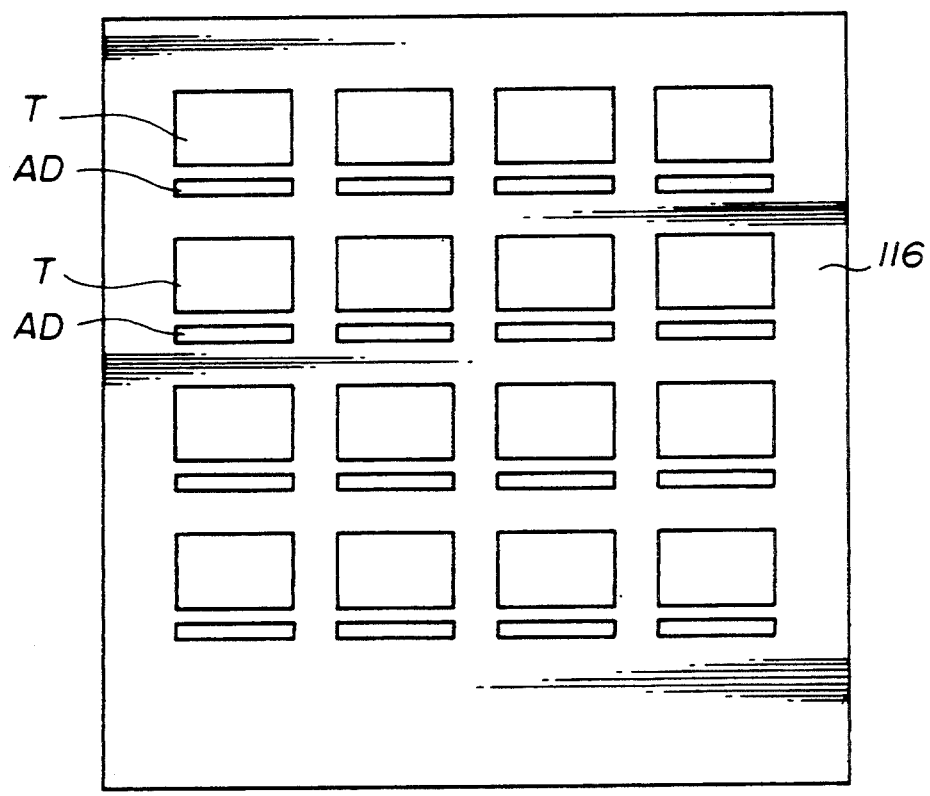
FIG. 12 shows an exemplified display image of illustrated titles.

FIG. 10 is a block diagram showing a third embodiment; FIG. 11 is a schematic illustration showing the third embodiment; and FIG. 12 shows an exemplified display image of illustrated titles. In this embodiment, the document recording medium is composed of a microfilm 40A, and the illustrated title recording medium and the address recording medium are composed of an external memory device such as a floppy disk.

As the partition plates 14 are discriminated by the partition plate discriminator 74 from the documents 10 fed through the document feeder 16, illustrated titles instructed by the partition plates 14 are read by the line sensor 70 to be recorded on a floppy disk 140. Then Images of the documents 10 of each document group 12 are photographed on the microfilm 40A using a camera 142 in a manner similar to that described with reference to FIGS. 5 and 6. The addresses or blip marks are also recorded on the microfilm 40A, for example, by the line LED 68 shown in FIGS. 6 and 7. The addresses of photographed documents are also recorded on the floppy disk 140.

The microfilm 40A, on which images of the documents 10 and addresses thereof or blip marks showing addresses are photographed, is developed by a developer 144 and then contained in a cartridge which is stored in the rack 112.

In searching, the floppy disk 140 is charged in a disk driving device of the computer 114, and illustrated titles are initially displayed on a display device 116. As one of the illustrated titles is designated, the microfilm reader 126 selects the microfilm 40A containing the designated illustrated title from the rack 112 to display the document groups 12 identified by the designated illustrated title on the screen 128. Then, the target document 10 is searched by means of the microfilm reader 126.

The addresses or the microfilm number may be displayed at the same time when the illustrated titles are displayed on the display device 116. For example, as shown in FIG. 12, an address display segment AD for displaying therein the microfilm reel number or frame number(s) of the microfilm, on which document groups identified by the designated title T are recorded, may be provided below each column for illustrated title T.

In searching, addresses (film number and/or frame number) of the target document groups 12 may be read visually from the display device 116 so that the target microfilm 40A is set manually in the microfilm reader 126 and target frame is then searched by manual operation.

Fourth Embodiment

Figure 13:
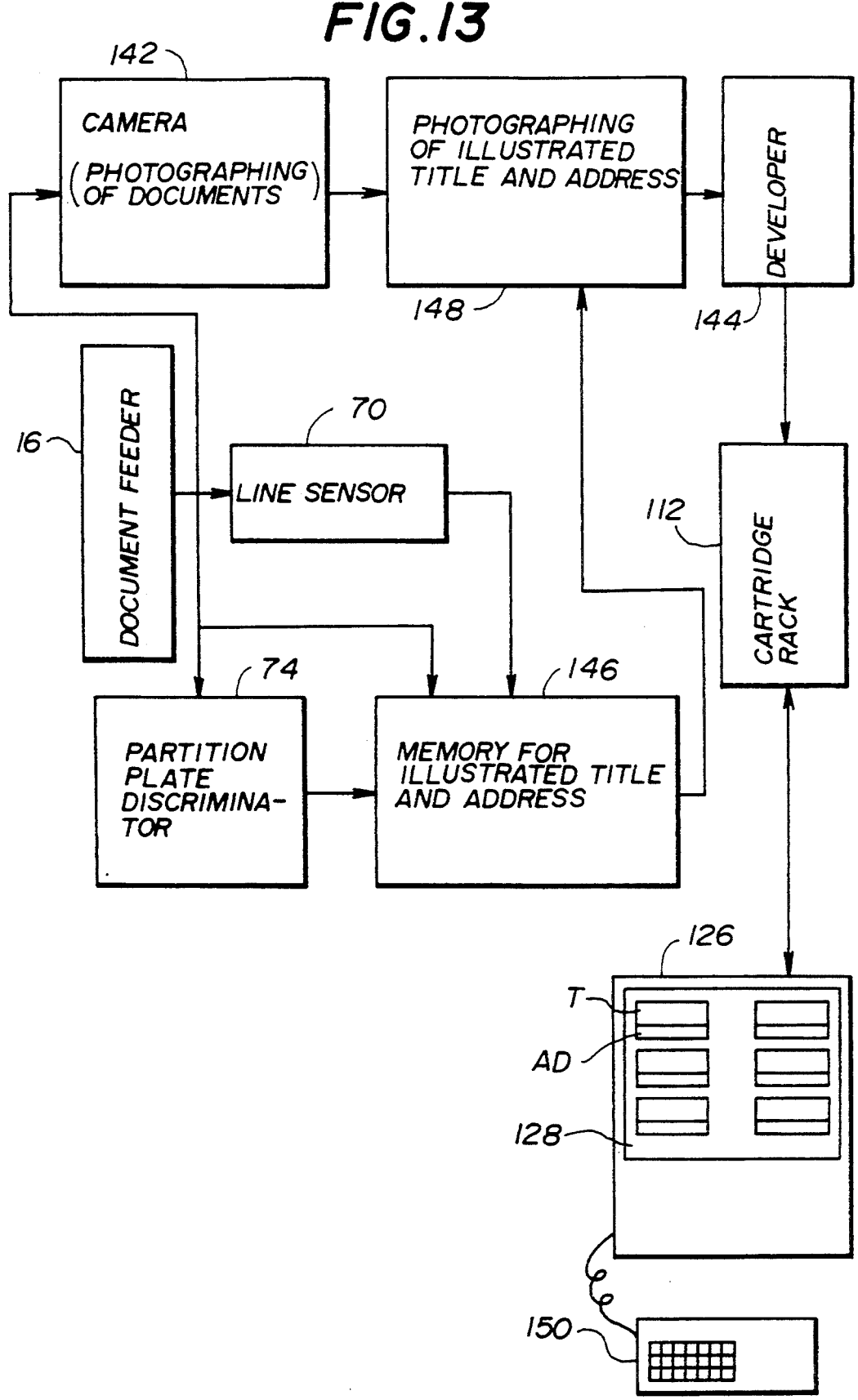
FIG. 13 is a schematic illustration showing a fourth embodiment.
Figure 14:
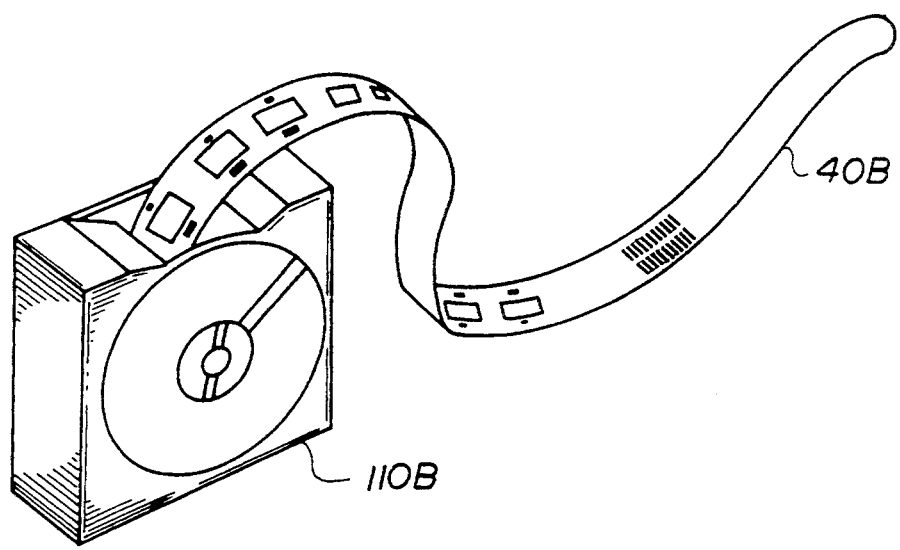
FIG. 14 is a perspetive view showing the microfilm used in the fourth embodiment and the cartridge therefor.
Figure 15:
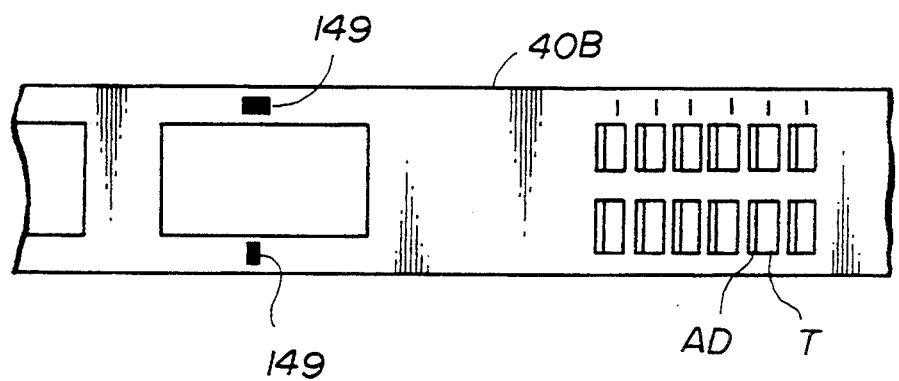
FIG. 15 is an enlarged view showing a portion of the microfilm of FIG. 14.

FIG. 13 is a schematic illustration of a fourth embodiment; FIG. 14 is a perspective view showing the microfilm 40B used in this embodiment and the cartridge 110B for containing the microfilm 40B; and FIG. 15 is an enlarged view showing a portion of the microfilm 40B.

Only the microfilm 40B is used as the recording medium in the fourth embodiment. As a partition plate 14 is discriminated by the partition plate discriminator 74 from the document 10 fed through the document feeder 16, the illustrated title is read by the line sensor 70 to be memorized temporarily in temporary memory means in the computer or an external memory device 146. At the same time, the address (frame number or other necessary data) of the document group 12 following the thus discriminated partition plate 14 and recorded on the microfilm 40B is also memorized in the temporary memory means 146. The document group 12 is photographed by a camera 142 on the microfilm 40B. The blip mark 149 (FIG. 15) or other mark showing the address is also photographed.

When photographing of all documents 10 is completed, all illustrated titles and addresses temporarily memorized in the memory means 146 are read and then recorded at the trailing end of the film 40B or the portion next to the last photographed region. The recording or photographing means 148 used for this purpose may be a line LED similar to the line LED 68 shown in FIGS. 6 and 7. Each address may be displayed in the segment AD below each of the illustrated titles T, as shown in FIG. 15.

The film 40B, on which all documents 10, illustrated titles and addresses are photographed, is developed by a developer 144 and then contained in a cartridge 110B which is stored in the rack 112.

In searching, multiple illustrated titles T are displayed together with the addresses AD on the screen of the microfilm reader 126, and one of the illustrated titles is designated. Designation may be effected by inputting the address AD displayed below the corresponding illustrated title through a keyboard 150. In lieu of input through the keyboard 150, a touch sensor may be provided on the screen 128 so that any one of the illustrated titles is touched to read the addresses of the document groups identified by the touched illustrated title.

As an illustrated title is designated, the microfilm reader 126 feed the film 40B to the address of the target document group 12 identified by the designated title to project the images of the document group 12. Then, the target document 10 can be searched by the operator through ordinary film feeding operation.

Additional Embodiments

In any of the illustrated embodiments, a predetermined recording medium, such as a digital recording medium including an optical disk or a microfilm, has been used as the document recording medium, and the documents recorded therein have been read out. However, there is a case where the target document is recorded an unknown recording medium which must be specified from plural recording media. To deal with such a case, one of the illustrated titles displayed on the display device 116 of the searching computer 114 shown in FIGS. 10 and 11 may be designated through a keyboard 122 or a pointing device such as a mouse 118 or touch panel, so that automatic searching is conducted throughout multiple recording media in which document groups identified by the designated illustrated title are contained, thereby to display the desired document groups on the display device 116.

In order to make it possible to display the documents recorded on a microfilm on the display device 116, the microfilm reader 126 is incorporated with a scanner for reading the projected images and then converting the thus read images into digital signals.

Document Group Discriminator

In each of the preceding embodiments, the partition plate 14 is interposed for discriminating individual document groups 12. The partition plate has a width (along the feeding direction) different from the width of each document 10 to be discriminated from the document. However, various modification may be made within the scope of the invention for easy discrimination of the partition plate.

Exemplified modifications of the partition plate 14 are shown in FIGS. 16A to 16E. The partition plate 14 shown in FIG. 16A has a width y which is smaller than the width y of the documents 10. The partition plate 14 shown in FIG. 16B has the same width and length as of the documents 10, but a corner is cut out as denoted by 152 to be discriminated from the documents 10. The partition plate 14 shown in FIG. 16C has one side, parallel to the feed direction, provided with plural indents 154. The sorts of respective document groups 12 may be discriminated by the indents 154.

Figure 16A:
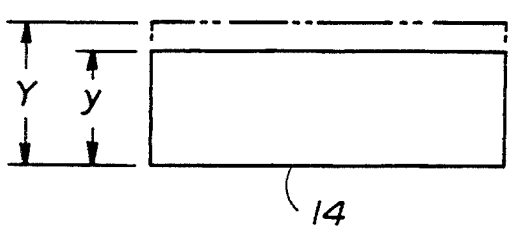
FIGS. 16A to 16E show various examples of the partition plates.
Figure 16B:
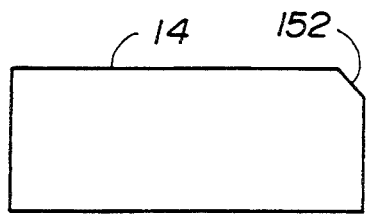
Figure 16C:
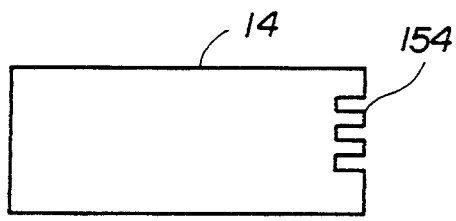
Figure 16D:
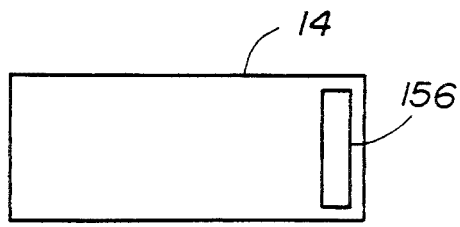
Figure 16E:
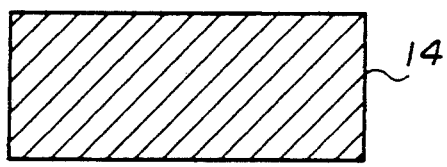

The partition plate 14 shown in FIG. 16D is attached with a discrimination tag 156. Similar to the partition plate 14 shown in FIG. 16C, the tag 156 may contain other necessary informations. The partition plate 14 shown in FIG. 16E has a color different from that of the documents 10.

In place of the partition plate 14, a discrimination mark may be attached to the first document 10 of each document group 12.

As will be seen from the foregoing, since the first document of each document group is discriminated and each document group is identified by a characteristic illustrated title, the illustrated titles being collectively recorded in an illustrated title recording medium and the correspondences between the illustrated titles and addresses of the document groups recorded in a document recording medium being recorded in an address recording medium, the target document groups being designated by viewing the illustrated titles by naked eyes to access to the corresponding document groups, access to the target document groups can effected simply and efficiently.

Since the illustrated titles are recorded as images, there is no need of inputting data by typing letters or like to make it possible to record document groups and corresponding illustrated titles efficiently in a short time.

Also provided is a system for use in the practice of the method of the invention. Partition plates may be interposed between the document groups for easy discrimination. The illustrations on the partition plates may be used directly as the illustrated titles.

In the system of the invention, the document images, illustrated titles and addresses may be recoreded in a single common recording medium, such as an optical disk or magneto-optical disk. When a single common recording medium is used, the system includes only one memory means, only one computer and only one display device. Compactness and simplification of the system is attainable, accordingly.

Alternatively, documents may be recorded duplicatively in a digital recording medium and also in a microfilm. A document image may be searched from the microfilm when an image of high quality is required, whereas a document image may be searched from the digital recording medium when speedy searching is required.

It is possible to record the illustrated titles and addresses in a digital recording medium such as a floppy disk and the documents are recorded in a microfilm. In such an alternation, since the disk needs not record the document images of high quality, the quality of the disk may be lowered without the fear of reducing the quality of the document images.

All of the illustrated titles, addresses and documents may be recorded on a microfilm. The illustrated titles and addresses are memorized in temporary memory means during the step of photographing the documents, and the memories relating to the illustrated titles and addresses are collectively photographed after the completion of photographing all documents. The system of this type has an advantage that the electrical image processing can be simplified.

When a microfilm is used as the recording medium, the searching means comprises a microfilm reader.

What is claimed is:

1. A method of recording and searching documents sorted into plural document groups, comprising the steps of:
   (a) providing partition plates before respective document groups, each partition plate comprising geographic information regarding a location of a particular portion of any one of sorted documents, an illustrated title for identifying the sort or specie of documents being present in said particular portion;
   (b) recording said plural document groups successively on a document recording medium;
   (c) discriminating the first document of each document group by sensing said partition plate;
   (d) recording said illustrated title present at said particular portion on a title recording medium;
   (e) memorizing addresses of respective document groups corresponding to respective illustrated titles on an address recording medium;
   (f) displaying said illustrated titles identifying the sorts or species of respective document groups during a searching operation;
   (g) designating a particular illustrated title selectively from the thus displayed titles to identify target document groups;
   (h) reading addresses of the target document groups from said address recording medium; and
   (i) accessing target document groups recorded at the thus read addresses on said document recording medium.

2. A method of recording and searching documents sorted into plural document groups, comprising the steps of:
   (a) attaching a discrimination mark on the first document of each document group, said discrimination mark identifying the first document of each document group and also comprising geographic information regarding a location of a particular portion of any one of a subsequently sorted documents an illustrated title for identifying the sort or :specie of documents being present in said particular portion;
   (b) recording said plural document groups successively on a document recording medium;
   (c) discriminating the first document of each document group by sensing said discrimination mark;
   (d) recording said illustrated title present at said particular portion on a title recording medium;
   (e) memorizing addresses of respective document groups corresponding to respective illustrated titles on an address recording medium;
   (f) displaying said illustrated titles identifying the sorts or species of respective document groups during a searching operation;
   (g) designating a particular illustrated title selectively from the thus displayed titles to identify target document groups;
   (h) reading addresses of the target document groups from said address recording medium; and
   (i) accessing target document groups recorded at the thus read addresses on said document recording medium.

3. A system for recording and searching documents sorted into plural document groups which are partitioned by partition plates provided before respective document groups, each partition plate comprising geographic information regarding a location of a particular portion of any one of sorted documents as an illustrated title identifying the specie or sort of documents following the partition plate, comprising:
   (a) a document group discriminator for sensing said partition plates to discriminate the top document of each document group;
   (b) an illustrated title recording medium for recording said particular portion instructed by said partition plate as the illustrated title;
   (c) a document recording medium for recording said documents;
   (d) an address recording medium for recording addresses of respective document groups corresponding to said illustrated titles which have been recorded on said illustrated title recording medium;
   (e) display means for displaying said plural illustrated titles recorded on said illustrated title recording medium;
   (f) designating means for designating a particular illustrated title selectively from said displayed titles to identify target document groups;
   (g) searching means for reading addresses of target document groups identified by said illustrated title designated by said designating means to access the thus searched document groups 4. The system of claim 3, wherein said illustrated title recording medium, said document recording medium and said address recording medium is a single common digital recording medium, and wherein said illustrated titles and said documents are recorded in different locations of said single common digital recording medium.

5. The system of claim 3, wherein said illustrated title recording medium and said address recording medium is a common digital recording medium, and wherein said document recording medium comprises a microfilm and said common digital recording medium so that documents are recorded duplicatively on both of said microfilm and said common digital recording medium.

6. The system of claim 5, wherein said searching means is a microfilm reader.

7. The system of claim 3, wherein said illustrated title recording medium and said address recording medium is a single common digital recording medium, and wherein said document recording medium comprises a microfilm.

8. The system of claim 7, wherein said searching means is a microfilm reader.

9. The system of claim 3, wherein said illustrated title recording medium, said document recording medium and said address recording medium is a single common microfilm, and wherein said system further comprises a temporary memory means for storing said illustrated titles and corresponding addresses of respsective document groups temporarily, and photographing means for collectively recording said illustrated titles and corresponding addresses on said microfilm.

10. The system of claim 9, wherein said searching means is a microfilm reader.

11. The system of claim 13, wherein said display means is a display device of a searching computer, and said designating means is a pointing device connected to said searching computer.

12. A system for recording and searching documents sorted into plural document groups, a discrimination mark being attached on the first document of each document group for identifying the first document of each document group and comprising geographic information regarding a location of a particular portion of any one of a subsequently document as an illustrated title for identifying the sort or specie of documents, comprising:
  (a) a document group discriminator for sensing said discrimination mark to discriminate the top document of each document group;
  (b) an illustrated title recording medium for recording said particular portion instructed by said discrimination mark as the illustrated title;
  (c) a document recording medium for recording said documents;
  (d) an address recording medium for recording addresses of respective document groups corresponding to said illustrated titles which have been recorded on said illustrated title recording medium;
  (e) display means for displaying said plural illustrated titles recorded on said illustrated title recording medium;
  (f) designating means for designating a particular illustrated title selectively from said displayed titles to identify target document groups;
  (g) searching means for reading addresses of target document groups identified by said illustrated title designated by said designating means to access the thus searched document groups.

13. The system of claim 12, wherein said illustrated title recording medium, said document recording medium and said address recording medium is a single common digital recording medium, and wherein said illustrated titles and said documents are recorded in different locations of said single common digital recording medium.

14. The system of claim 12, wherein said illustrated title recording medium and said address recording medium is a common digital recording medium, and wherein said document recording medium comprises a microfilm and said common digital recording medium so that documents are recorded duplicatively on both of said microfilm and said common digital recording medium.

15. The system of claim 14, wherein said searching means is a microfilm reader.

16. The system of claim 12, wherein said illustrated title recording medium and said address recording medium is a single common digital recording medium, and wherein said document recording medium comprises a microfilm.

17. The system of claim 16, wherein said searching means is a microfilm reader.

18. The system of claim 12, wherein said illustrated title recording medium, said document recording medium and said address recording medium is a single common microfilm, and wherein said system further comprises a temporary memory means for storing said illustrated titles and corresponding addresses of respsective document groups temporarily, and photographing means for collectively recording said illustrated titles and corresponding addresses on said 19. The system of claim 18, wherein said searching means is a microfilm reader.

20. The system of claim 12, wherein said display means is a display device of a searching computer, and said designating means is a pointing device connected to said searching computer.

* * * * *